United States Patent [19]

Mallow

[11] 4,030,939
[45] June 21, 1977

[54] CEMENT COMPOSITION

[75] Inventor: William A. Mallow, San Antonio, Tex.

[73] Assignee: Southwest Research Institute, San Antonio, Tex.

[22] Filed: July 30, 1975

[21] Appl. No.: 600,258

[52] U.S. Cl. .................................. 106/74; 106/84
[51] Int. Cl.² ........................................ C04B 35/16
[58] Field of Search ............................... 106/74, 84

[56] References Cited

UNITED STATES PATENTS

| | | | |
|---|---|---|---|
| 2,914,413 | 11/1959 | Mercer | 106/84 |
| 3,450,548 | 6/1969 | Petkus | 106/84 |
| 3,547,840 | 12/1970 | Stastny et al. | 106/84 |
| 3,874,887 | 4/1975 | Dalmatov et al. | 106/84 |

*Primary Examiner*—J. Poer
*Attorney, Agent, or Firm*—Fulbright & Jaworski

[57] ABSTRACT

A cement composition consisting of the product of a mixture of spray-dried hydrated silicate powder, a silica polymer-forming agent and water. The resulting inorganic silica polymer cement is capable of withstanding sustained exposure to high temperatures without loss of desirable mechanical properties and has a high degree of adhesive as well as compressive strength together with rapid room temperature curing characteristics. A siliceous filler may be added. In addition, a fluoride or halide fixation agent may be added so that the resulting cement product may resist higher temperatures.

14 Claims, No Drawings

CEMENT COMPOSITION

BACKGROUND OF THE DISCLOSURE

Refractory silica bricks or molded silica products traditionally have been prepared by energy-intensive methods that require costly kilns, high consumption of fuel and carefully regulated chemical formulation, pre-heating, firing and cooling cycles to achieve reproducible quality products. Various calcium aluminate and calcined alumina cement and refractory molding products have been produced, but none of these has achieved the combined properties of fast curing, high adhesive bonding qualities, low material cost, universal raw material accessibility or availability, together with good mechanical, thermal and chemical properties. Thus, a need exists for a product that combines the above qualities with simplicity of use so as to preclude any special skill or training to accommodate the product to various uses.

Among the uses inherent to a product of the nature herein described are rapid repair of roadways and runways without special pretreatment or conditioning to assure adhesion to old concrete and earthen surfaces; a brick mortar which provides a bond strength often greater than the tensile strength of brick, making it possible to prefabricate tilt-up walls which can be mass produced offsite and delivered intact to job sites; repair or construction of moderately high temperature kilns; production of refractory bricks; production of mortar for bonding refractory bricks; production of cast-in-place structures capable of high temperature exposure having appropriate accommodation for thermal expansion; and chemically resistant coatings for pipes, reactor vessels, storege tanks and the like which exhibit excellent adhesion to metal, resistance to abrasion and inertness to most concentrated mineral acids. The cement or molding product of the nature disclosed herein is chemically compatible with glass fibers thereby allowing such fibers to be used as reinforcement, the resulting product having outstanding structural and mechanical properties.

In the field of art to which the present invention pertains, applicant is aware of U.S. Pat. Nos. 3,138,471, 3,450,548, 3,490,931, 3,813,253, 3,829,320 and an article entitled "Acid Resistant Concrete" by M. S. Crowley and J. F. Wygant, Chemical Engineering Progress, pages 44–48, Feb., 1968. Of the foregoing, Applicant deems the most pertinent to be U.S. Pat. Nos. 3,138,471 (the '471 patent), 3,450,548 (the '548 patent) and 3,490,931 (the '931 patent).

The '471, '548 and '931 patents are each directed to chemically setting, acid-resistant cemant products containing silicate of soda as a binder. These patents all disclose a silica-to-soda ratio of 3.01:1 to 3.22:1. It has been found in practice that these ratios provide products inferior to the present invention from the standpoint of poor adhesion to other cements and metals. The cements disclosed in these three patents are very fast setting and consequently are not particularly adaptable for the domain of applications needed for an adhesive and high temperature cement. The typical setting time of 15 minutes for these prior art products does not provide adequate working time for the cements. Even the '931 patent product containing a retardant allows only 45 to 75 minutes working time.

The cement slurries resulting from the process disclosed by the '471, '548 and '931 patents are extremely thick and cannot be easily trowled, sprayed or molded. They have the viscosity of bread dough, and any extra water added to decrease viscosity reduces the strength as outlined on page 44 of the referenced Crowley article. The compositions all prescribe about 13% total water including the water in the sodium silicate solution, and the compressive strength of the product of these compositions is 2,500 pounds per square inch (psi) with this percentage of dilution. The disclosed recipes of these three patents which provide compressive strengths of over 2,500 psi cannot be molded without the use of a compaction device such as would compress a damp cake into a cube or testing. Thus it is apparent that the formulations of the '471, '548 and '931 patents have definite limitations.

SUMMARY OF THE INVENTION

The present invention is directed to a type of cement characterized by room temperature curing, high adhesive strength, excellent mechanical and chemical properties and resistance to intense heating together with general material availability at low cost. The cements according to the present invention are amorphous polymers of silica with minimal amounts of silanol group character and which, upon dehydration via heating, achieve strengths greater than those obtained at room temperature as compared to many conventional inorganic cements that are weakened or destroyed by heating.

The silica cement of the present invention achieves its unique properties from the nature and class of fillers and reagents employed. A class of spray-dried alkali metal silicate hydrated powders of a narrow range of $SiO_2$:$Na_2O$ ratios has surprisingly been found to produce a high degree of fluidity in slurries with very small quantities of water. The latter feature constitutes one source of the unique physical, chemical and mechanical properties described herein. Water, essential to the chemical curing of most inorganic cement systems, is quantitatively important to the final product properties. That is, any excess or residual water in a cured product evaporates leaving pores and sites of vulnerability to freeze-thaw damage, infusion of foreign matter, reduced strength and the like. Trapped water or waters of hydration common to all hydraulic cements like Portland limit the heat resistance of the products. Since the cement composition of the present invention employs only from about 10 to about 12% by weight moisture in its most common product applications, a higher degree of impermeability and greater mechanical strength may be achieved than is otherwise possible.

One of the important constituents of the cement of the present invention and which further distinguishes it from prior art cements is the alkali metal silicate hydrate powder. The powder used in the present invention is prepared by conventionally spray drying a solution of sodium silicate under conditions of temperature, air velocity and relative humidity to produce the free-flowing microspheres incorporated herein. surprisingly, the spray-dried product possesses properties different from the parent material from which it is produced. Aqueous solutions prepared from the spray-dried powder possess different physical and chemical properties than the original solutions from which the powders were prepared. Hence, the spray-dried product does not revert to its original form upon dissolution and is, therefore, a truly different species. Viscosity, reactivity, alkalinity, and clarity of the dissolved powders are altered by the spray drying. These alterations are not completely understood, but they manifest unexpected and unique properties in the practice of this invention as compared with the prior art which discloses use of the parent solutions. It is theorized that some degree of carbon dioxide attack occurs during drying which alters the chemical association of the sodium oxide with the silica creating a new species of product which is sufficiently different to manifest the remarkable behavioral difference described herein including adhesiveness of the cement, high fluidity of the slurries, slow and controlled reaction rates and setting time, plus enhanced mechanical and thermal properties.

In the spray-drying operation, liquid sodium silicate solutions are atomized by discharging them from high speed, centrifugal discs which deliver the microdroplets into a closed circuit of flowing hot air or hot gases which reduce the water content of the droplets to a preselected concentration whereupon the partially dehydrated droplets solidify and are collected in cyclone separators. The recovered solids contain approximately 18% by weight of water in some form (bound chemically to the molecular structure as either hydrates or just mechanically absorbed and adsorbed). Upon dispersion in water, these powders readily dissolve, but the chemical and physical properties are surprisingly different from the parent solution from which the powders were generated.

The higher ratio $SiO_2/Na_2O$ hydrate powders, i.e., up to 3.22:1, are useful in the present invention, but caution should be exercised against prolonged storage of these reagents (over one month after spray drying) as they apparently undergo serious change in their behavior and reactivity in the cement systems. The 2.4:1 ratio exhibits optimum storage stability and gives reproducible results irrespective of age, but this ratio material, as others, must be protected from atmospheric attack, especially by $CO_2$ and moisture during storage. Hence the 2.4:1 ratio is preferred in this invention as being a more practical commercial product which can be predictably consistent in its performance.

Spray-dried hydrated sodium silicate powder that is quite suitable for use in the recipes of the present invention is manufactured by Philadelphia Quartz Company of Philadelphia, Pa. The latter company markets the product under the trademark "Britesil".

The formulation of the present cement composition includes alkali metal silicate hydrates of a range of about 2.4:1 to about 3.22:1 ratio of $SiO_2:M_2O$ (wherein M includes sodium and/or potassium) together with silica polymer-forming agents such as potassium silicofluoride ($K_2SiF_6$) and/or sodium silicofluoride ($Na_2SiF_6$) as precursors of weak acids. Preferably, a siliceous filler is added to the formulation, the filler comprising siliceous sands, silica flour, flyash, clays and/or other argillaceous minerals of high silica content as both filler and co-reactants. These materials are mixed or blended in dry form to which water is then added to induce a partial solution of the alkali metal hydrate powders and thereby fluidize the mixture through the release of a colloidal electrolyte that imposes a partial charge on the slurry inducing a high degree of lubricity where equivalent slurries without the electrolyte would appear as slightly dampened powders. This liquidication does not occur immediately upon addition of water to the dry powder. After about two minutes with little or no agitation, the dampened mass suddenly and surprisingly liquifies to a highly fluid state which can be readily poured, pumped or extruded. The slurry can subsequently be rendered thixotropic by addition of any suitable bentonite material.

While Applicant is not bound by any theory as to the nature of the reactions involved in the present invention, it is believed that a polymerization reaction ensues as the silica polymer-forming agent slowly hydrolyzes and liberates small quantities of acid. A localized (that is, in the immediate area of each particle) pH of about 2.5 to about 3.5 is created which induces a steady polymerization of silicic acid hydrogel liberated by the neutralization of sodium silicate by, for example, hydrogen fluoride. As the liberated acid is consumed and converted to sodium fluoride, the silicic acid polymerizes to a continuous network of high molecular weight products that solidify about the filler, binding the material together. The siliceous and uniquely charged colloidal hydrogel attacks metal and mineral surfaces to provide the basis for achieving silicate bond to that surface. The same mechanism is believed to provide adhesion to mineral, metal and any compatible surface in which the appropriate surface free energy of bonding is available. Since sodium fluoride thus produced may act as a fluxing agent to the silica polymer matrix (that is, to depress the melting point of the silica polymer) and silica filler at temperatures varying with the concentration of sodium fluoride present, it is necessary to minimize the quantity of sodium fluoride produced and/or fix or tie up that which is generated into an inert form. Thus, an objective of the present invention is the provision of additional, secondary, heat activated, fluoride or halide fixation agents that are added as an option to avail the cured product for use in temperature regions above 1,500° F.

Both the concept of minimizing the quantity of sodium fluoride produced and the concept of fixing or tying up the sodium fluoride produced are employed in the present invention. Thus, the concentration of sodium fluoride produced is maintained at about 4% by weight or less in the initial reaction. With the addition of fluoride fixation agents, the latter percentage of sodium fluoride is further reduced or eliminated by the addition of heat or during the final employment of the cement product in its thermal environment.

Fluoride scavengers or fixation agents that may be employed according to the present invention include calcium phosphates (either dibasic or tribasic), magnesium phosphates (either dibasic or tribasic), aluminum phosphates, polyvalent metal oxides such as MgO, $Al_2O_3$, $Fe_2O_3$, FeO, $V_2O_5$, $Hf_2O_5$ and $TiO_2$, calcium borates such as colemanite, synthetic colemanite, calcium tetraborate pentahydrate and other metal salts that form insoluble and temperature-resistant fluoride salts or complexes when combined with sodium fluoride. In the fluoride fixation reaction, cryolite or aluminum hydroxyfluoride may be formed. However, the fluorides of calcium aluminum and the like do not flux or depress the melting point of silica polymers at low temperature (that is, below 1,800° F.) and many are stable to temperatures over 2,000° F.

It is, therefore, an object of the present invention to provide a cement composition, the product of which offers high strength, rapid hardening and outstanding adhesion to other cements, minerals or metals at costs competitive with general construction cements obtained by energy-intensive means, while requiring very little energy to produce the improved product.

A further objective of the present invention is the provision of a family of cements with controlled and variable rates of hardening; having a variety of rheological properties inherent to the wet slurry; comprises of an intercommunicating network or matrix of silica polymer; being curable at room temperature and containing no Portland cement or other hydraulically cured mineral crystalline species that are inherently sensitive to decomposition at low or moderately low temperatures (that is, at about 1,000° F.); an adhesive cement highly useful for repairing masonry structures, roadways and the like; possesses high mechanical strength, chemical resistance, abrasion resistance and resistance to intense and prolonged heating and heat cycling; is prepared from materials which in themselves are abundantly available, are of low cost and which do not require large amounts of fuel or energy to manufacture; is castable or extrudable as a slurry that neither shrinks or expands upon curing, is not exothermic in its cure and requires minimal amounts of mositure to achieve maximum workability and curing rates; and is chemically compatible as a binder for use with conventional glass fiber material.

Yet a further object of the present invention is the provision of such a composition consisting essentially of a mixture of hydrated sodium silicate, a silica polymer-forming agent and water.

Another object of the present invention is the provision of such a composition including, additionally, a siliceous filler as well as a fluoride fixation agent.

Still another object of the present invention is the provision of such a composition comprising specific materials in weight ratios described herein.

Other and further objects, features and advantages will be apparent in the following description of presently preferred embodiments of the invention, given for the purpose of disclosure.

DESCRIPTION OF THE PREFERRED EMBODIMENT

The preferred embodiment(s) of the present invention is best described by reference to the following examples:

The following proportions of dry solids are preblended and then mixed uniformly with water in the proportions indicated to provide a dampened, solid mass. The hydrated alkali metal silicate powders are of the spray-dried type as explained previously, and the ranges of operable proportions of all ingredients are set forth as well as the more specific and preferred proportions.

EXAMPLE 1

|  | Parts by Weight | |
|---|---|---|
|  | Range | Preferred |
| Sand (10 to 60 mesh) | 0–100 | 50 |
| Silica flour | 0–100 | 25 |
| Hydrated sodium silicate powder of 2.4:1 ratio $SiO_2/Na_2O$ | 3–20 | 10 |
| Sodium silicofluoride | 2–8 | 5 |
| Water | 8–20* | 11* |

*Per hundred parts by weight of total solids ("phpts").

Upon standing or continued mixing, the mixture will spontaneously liquefy and achieve a slightly dilatant rheological property having a viscosity measured by a Brookfield viscometer of from about 700 to 4,500 centipoises (cps) depending upon the mesh size of the filler material. After about 6 hours at room temperature (about 75° F.), a hard set is obtained (about 400 psi) which progressively increases from about 4,000 to about 5,000 psi in compression strength within 24 hours as measured by the standard ASTM C109 method. Thereafter, little increase in compressive strength is noted until heat is applied. The tensile strength averages from about 15 to about 25% of compression depending upon gradation of fillers and age of specimens. That is, the finer the filler material, the higher the gradation and the older the specimen, the higher the tensile strength.

Upon heating to over 1,800° F., the product becomes detectably (slightly) softened as the silica polymer is partially vitrified by the fluxing effect of fluoride residues. When cooled, the product returns to its rigid state but is much enhanced in compressive strength (over 10,000 psi) and hardness (Mohs' scale of about 7.0 to about 8.0). The cement slurry of this recipe bonds to old cement, bricks, metal, glass, etc., so tenaciously that to remove it requires destruction of the cement (cohesive failure of the cement) or destruction of the substrate (delamination or cohesive failure of substrate).

A higher surface temperature resistance product is achieved by addition of fluoride fixation or complexing agents such as those illustrated in Examples 2 through 6 and being the compositions listed immediately above water in each example.

EXAMPLE 2

|  | Parts by Weight | |
|---|---|---|
|  | Range | Preferred |
| Sand (10 to 60 mesh) | 0–100 | 50 |
| Silica flour | 0–100 | 25 |
| Hydrated sodium silicate powder of 2.4:1 ratio $SiO_2/Na_2O$ | 3–20 | 10 |
| Sodium silicofluoride | 2–9 | 4 |
| Dibasic calcium phosphate ($Ca_2HPO_4$) | 1–10 | 5 |
| Water | 8–20 phpts | 11 phpts |

The physical characteristics of this formulation are identical to those of Example 1 in all aspects except that, upon gradual heating to about 2000° F., the product retains its rigidity and will withstand heating to about 2300° F. before any softening is observed.

EXAMPLE 3

|  | Parts by Weight | |
|---|---|---|
|  | Range | Preferred |
| Sand (10 to 60 mesh) | 0–100 | 50 |
| Silica flour | 0–100 | 25 |
| Hydrated sodium silicate powder of 2.4:1 ratio $SiO_2/Na_2O$ | 3–20 | 10 |
| Sodium silicofluoride | 2–8 | 4 |
| $Al(OH)_3$ (from $Na_2Al_2O_3$ plus $NH_4OH$) | 1–10 | 5 |
| Water | 8–20 phpts | phpts |

This formulation exhibits all the physical properties of the product resulting in Example 1 except that upon gradual heating to 1800° F., no softening is observed. Instead the product will resist temperature of over 2000° F. with no loss of mechanical properties.

EXAMPLE 4

|  | Parts by Weight | |
|---|---|---|
|  | Range | Preferred |
| Sand (10 to 60 mesh) | 0–100 | 50 |
| Silica flour | 0–100 | 25 |
| Hydrated sodium silicate powder of 2.4:1 ratio $SiO_2/Na_2O$ | 3–20 | 10 |
| Sodium silicofluoride | 2–8 | 4 |
| Colemanite or calcium borates (other than calcium tetraborate pentahydrate salts) | 1–10 | 2 |
| Water | 8–20 phpts | 11 phpts |

This product possesses all the physical properties exhibited by the product of Example 1 except that upon heating to 1,800° F. there is no observed softening. The product will withstand temperatures of over 1800° F. without loss of mechanical properties.

EXAMPLE 5

|  | Parts by Weight | |
|---|---|---|
|  | Range | Preferred |
| Sand (10 to 60 mesh) | 0–100 | 50 |
| Silica flour | 0–100 | 25 |
| Hydrated sodium silicate powder of 2.4:1 ratio $SiO_3Na_2O$ | 3–20 | 10 |
| Sodium silicofluoride | 2–8 | 4 |
| Calcium tetraborate pentahydrate | 1–10 | 2 |
| Water | 8–20 phpts | 11 phpts |

The slurry of this recipe gels irreversibly in about 15 minutes and continues to harden at an accelerated rate compared to the rate exhibited by the product of Example 1. The cured product exhibits resistance to temperatures of about 1,800° F. without softening or loss of mechanical strength.

EXAMPLE 6

|  | Parts by Weight | |
|---|---|---|
|  | Range | Preferred |
| Sand (10 to 60 mesh) | 0–100 | 50 |
| Silica flour | 0–100 | 25 |
| Hydrated sodium silicate powder of 2.4:1 ratio $SiO_2Na_2O$ | 3–20 | 10 |
| Sodium silicofluoride | 2–8 | 4 |
| Magnesium phosphate (tribasic) | 1–10 | 2 |
| Water | 8–20 phpts | 11 phpts |

The addition of magnesium phosphate induces early setting of the product. In about one hour the slurry gels irreversibly and hardens progressively at an accelerated rate compared to the rate exhibited by the product of Example 1. The cured product has physical characteristics which are different from those exhibited by the product of Example 1 in that temperatures of over 1,900° F. (1,900°–1,950°) will not detectably alter the mechanical strength.

EXAMPLE 7

The concentration of the binder or polymer-forming agent may be reduced somewhat as a means of reducing the cost of the product for applications that are economically restrictive. A consequent reduction in compressive strength is offset by a slight improvement in heat resistance of the resulting product.

|  | Parts by Weight | |
|---|---|---|
|  | Range | Preferred |
| Sand (20 to 60 mesh) | 0–100 | 50 |
| Silica flour (through 325 mesh) | 0–100 | 25 |
| Hydrated sodium silicate powder ratio 2.4:1 $SiO_2/Na_2O$ | 3–20 | 7 |
| Sodium silicofluoride | 2–8 | 2.5 |
| Water | 7–20 phpts | 10 phpts |

This formulation behaves and performs similarly to the products of Example 1 in most respects but is inherently more resistant to high temperatures by virtue of its reduced fluoride content, and it possesses a slightly reduced compressive strength (3000–3500 psi).

EXAMPLE 8

An increase in binder or polymer-forming agent content will impart a greater compressive strength but has lower surface temperature resistance as illustrated in this example.

|  | Parts by Weight | |
|---|---|---|
|  | Range | Preferred |
| Sand (10 to 60 mesh) | 0–100 | 50 |
| Silica flour | 0–100 | 25 |
| Hydrated sodium silicate powder of 2.4:1 ratio $SiO_2/Na_2O$ | 10–30 | 20 |
| Sodium silicofluoride | 5–15 | 10 |
| Water | 8–20 phpts | phpts |

The product of this example will achieve compressive strengths of 8,000 psi after being allowed to set for 24 hours.

EXAMPLE 9

Flyash can be substituted for part or all of the silica flour in Example 1 or Example 6. The resulting product has similar physical characteristics to the product of Example 1 or Example 6 after set. During molding the product of the example is different in color from both other examples and has less viscosity than the product of Example 1. Use of flyash in place of silica flour is more economical.

EXAMPLE 10

Fluoride fixation agents such as those specified in Example 2, 3, 4 and 5 can be added to the constitutents of Examples 7 and 8. However, the resulting products are less resistant to high temperatures.

EXAMPLE 11

Potassium silicofluoride can be substituted for sodium silicofluoride as used in Example 1.

|  | Parts by Weight | |
|---|---|---|
|  | Range | Preferred |
| Sand (10 to 60 mesh) | 0–100 | 50 |
| Silica flour | 0–100 | 25 |
| Hydrated sodium silicate powder of 2.4:1 ratio $SiO_2/Na_2O$ | 3–20 | 10 |
| Potassium silicofluoride | 2–8 | 5 |
| Water | 8–20 phpts | 11 phpts |

Upon standing or continued mixing, the mixture will spontaneously liquefy and achieve a slightly dilatant rheological property having a viscosity measured by a Brookfield viscometer of from about 700 to about 4,500 centipoises (cps) depending upon the mesh size of the filler material. After about three hours at room temperature (about 75° F.), a hard set is obtained (about 400 psi) which progressively increases from about 4,000 to about 5,000 psi in compression strength within 24 hours as measured by the standard ASTM C109 method. Thereafter, little increase in compressive strength is noted until heat is applied. Otherwise, the characteristics and properties are similar to those explained in Example 1.

EXAMPLE 12

Hydrated sodium silicate powder having an $SiO_2/Na_2O$ ratio of as high as about 3.22:1 can be substituted for the powder having a ratio of 2.4:1 in Example 1.

|  | Parts by Weight | |
| --- | --- | --- |
|  | Range | Preferred |
| Sand (10 to 60 mesh) | 0–100 | 50 |
| Silica flour | 0–100 | 25 |
| Hydrated sodium silicate powder of 3.22:1 ratio $SiO_2/Na_2O$ | 3–20 | 10 |
| Sodium silicofluoride | 2–8 | 5 |
| Water | 8–20 phpts | 11 phpts |

Upon standing or continued mixing, the mixture will spontaneously liquefy and achieve a slightly dilatant rheological property having a viscosity measured by a Brookfield viscometer of from about 700 to about 4,500 centipoises (cps) depending upon the mesh size of the filler material. After about 6 hours at room temperature (about 75° F.), a hard set is obtained (about 400 psi) which progressively increases from about 4000 to about 5,000 psi in compression strength within 24 hours as measured by the standard ASTM C109 method. Thereafter, little increase in compressive strength is noted until heat is applied. The tensile strength averages from about 15 to about 25% of compression depending upon gradation of fillers and age of specimens. That is, the finer the filler material, the higher the gradation, and the older the specimen, the higher the tensile strength.

The properties and characteristics of the product prepared according to this example are similar to those described with respect to Example 1. However, unlike the behavior of the 2.4:1 ratio hydrated sodium silicate powder, the 3.22:1 ratio type powder appears to undergo chemical change after storage for about 30 days in a closed container when prepared by a spray-drying process. Reproducible results according to Example 12 were obtained only when freshly generated and previously unopened containers of hydrated sodium silicate powder were used.

EXAMPLE 13

While more expensive, hydrated potassium silicate powder may be substituted for sodium silicate as demonstrated in this example.

|  | Parts by Weight | |
| --- | --- | --- |
|  | Range | Preferred |
| Sand (10 to 60 mesh) | 0–100 | 50 |
| Silica flour | 0–100 | 25 |
| Hydrated potassium silicate powder of 2.4:1 ratio $SiO_2/K_2O$ | 3–20 | 10 |
| Sodium silicofluoride | 2–8 | 5 |

|  | Parts by Weight | |
| --- | --- | --- |
|  | Range | Preferred |
| Water | 8–20 phpts | 11 phpts |

Upon standing or continued mixing, the mixture will spontaneously liquefy and achieve a slightly dilatant rheological property having a viscosity measured by a Brookfield viscometer of from about 700 to about 4,500 centipoises (cps) depending upon the mesh size of the filler material. After about 3 hours at room temperature (about 75° F.), a hard set is obtained (about 400 psi) which progressively increases from about 4,000 to about 5,000 psi in compression strength within 24 hours as measured by the standard ASTM C109 method. Thereafter, little increase in compressive strength is noted until heat is applied, and the properties and characteristics of the cement are similar to those of the cement product of Example 11.

Surprisingly, it has been found that hydrated potassium silicate powder and potassium silicofluoride cannot be used in combination to the exclusion of either hydrated sodium silicate powder or sodium silicofluoride without sacrificing the beneficial properties of the cement product. The reasons for this phenomenon are not readily explainable. Thus in the combination of the present invention, if hydrated potassium silicate powder is employed, sodium silicofluoride should be used as the silica polymer-forming agent. On the other hand, if potassium silicofluoride is employed as the silica polymer-forming agent, hydrated sodium silicate powder should be used therewith.

Many uses of formulations according to the present invention may be made depending on temperature requirements, length of time available for setting and curing, and desired compressive and tensile strength of the finished product. It will be apparent to those skilled in the art that formulations of the invention may be used for a variety of applications.

The present invention, therefore, is well adapted to carry out the objects and attain the ends and advantages mentioned as well as others inherent therein. While presently preferred embodiments of the invention have been given for the purpose of disclosure, numerous changes in the details of formulations and operation of the methods involved can be made which will readily suggest themselves to those skilled in the art and which are encompassed within the scope of the invention and the scope of the appended claims.

What is claimed is:

1. A cement composition consisting essentially of,
   a. spray-dried hydrated sodium silicate powder having a weight ratio of $SiO_2:Na_2O$ in the range of from about 2.4:1 to about 3.22:1,
   b. a silica polymer-forming agent selected from the group consisting of potassium silicofluoride and sodium silicofluoride, and
   c. water.

2. The composition of claim 1 including, additionally, a siliceous filler.

3. The composition of claim 1 including, additionally, a fluoride fixation agent.

4. The composition of claim 1 including, additionally, a siliceous filler and a fluoride fixation agent.

5. a cement composition consisting essentially of, a. spray-dried hydrated potassium silicate powder having a weight ratio of $SiO_2:K_2O$ in the range of from about 2.4:1 to about 3.22:1,
b. a silica polymer-forming agent consisting of sodium silicofluoride, and
c. water.

6. The composition of claim 5 including, additionally, a siliceous filler.

7. The composition of claim 5 including, additionally, a fluoride fixation agent.

8. The composition of claim 5 including additionally, a siliceous filler and a fluoride fixation agent.

9. A cement composition consisting essentially of,
a. a siliceous filler selected from the group consisting of siliceous sand, silica flour, flyash and siliceous clay,
b. spray-dried hydrated sodium silicate powder having a weight ratio of $SiO_2:Na_2O$ in the range of from about 2.4:1 to about 3.22:1,
c. a silica polymer-forming agent selected from the group consisting of potassium silicofluoride and sodium silicofluoride, and
d. water.

10. The cement composition of claim 9 wherein the parts by weight of the mixture are in the ranges of,
a. about 0 to about 200 parts filler,
b. about 3 to about 30 parts of spray-dried hydrated sodium silicate powder,
c. about 2 to about 15 parts silica polymer-forming agent, and
d. about 7 to about 20 parts of water per hundred parts of solids.

11. The cement composition of claim 10 wherein, more particularly, the parts by weight of the mixture include,
a. about 75 parts siliceous filler,
b. about 10 parts spray-dried hydrated sodium silicate powder,
c. about 4 parts silica polymer-forming agent, and
d. about 11 parts of water per hundred parts of solids.

12. The cement composition of claim 10 including, additionally, a fluoride fixation agent.

13. The cement composition of claim 10 including, additionally, from about 1 to about 10 parts by weight of a fluoride fixation agent selected from the group consisting of dibasic calcium phosphate, alumina trihydrate, colemanite, calcium tetraborate pentahydrate and tribasic magnesium phosphate.

14. The cement composition of claim 9 including, additionally, glass fiber.

* * * * *

UNITED STATES PATENT OFFICE
CERTIFICATE OF CORRECTION

Patent No. 4,030,939          Dated      June 21, 1977

Inventor(s) William A. Mallow

It is certified that error appears in the above-identified patent and that said Letters Patent are hereby corrected as shown below:

Column 1, line 35, cancel "storege" and insert -- storage --

Column 1, line 53, cancel "cemant" and insert -- cement --

Column 2, line 13, after "cube" insert -- for curing --

Column 2, line 59, cancel "surpris-" and insert -- Surpris- --

Column 3, line 13, cancel "time" and insert -- times --

Column 5, line 4, cancel "comprises" and insert -- comprised --

Column 5, line 67, after "to" insert -- about --

Column 6, in Example 2, after "$SiO_2$" insert -- / --

Column 6, in Example 3, last line before "phpts" under "Preferred" insert -- 11 --

Column 6, line 67, cancel "temperature" and insert -- temperatures --

Column 7, in Example 5, cancel "$SiO_3Na_2O$" and insert -- $SiO_2/Na_2O$ --

Column 7, in Example 6, after "$SiO_2$" insert -- / --

Column 8, in Example 8, last line before "phpts" under "Preferred" insert -- 11 --

Column 10, line 38, cancel "strength" and insert -- strengths --

Signed and Sealed this

Eighth Day of November 1977

[SEAL]

Attest:

RUTH C. MASON  
Attesting Officer

LUTRELLE F. PARKER  
Acting Commissioner of Patents and Trademarks